United States Patent [19]
Schneider

[11] Patent Number: 5,806,927
[45] Date of Patent: Sep. 15, 1998

[54] ADJUSTABLE LUMBAR SEAT SUPPORT

[75] Inventor: William E. Schneider, Dandridge, Tenn.

[73] Assignee: American Components, Inc., Dandridge, Tenn.

[21] Appl. No.: 827,808

[22] Filed: Apr. 11, 1997

[51] Int. Cl.[6] .............................. A47C 3/025; A47C 7/46
[52] U.S. Cl. ................................ 297/284.4; 297/284.3; 297/284.6; 297/452.49
[58] Field of Search ..................... 297/452.49, 452.51, 297/452.5, 284.3, 284.6, 284.2, 284.8, 452.15, 452.52, 284.4; 267/160, 42; 248/576, 614, 618

[56] References Cited

U.S. PATENT DOCUMENTS

| | | |
|---|---|---|
| 134,853 | 1/1873 | Cliff . |
| 162,165 | 4/1875 | Godley . |
| 759,507 | 5/1904 | Ericson et al. ............... 267/42 |
| 1,153,058 | 9/1915 | Gilfillan .................... 267/42 |
| 4,567,615 | 2/1986 | Fanti . |
| 5,076,643 | 12/1991 | Colasanti et al. . |

Primary Examiner—Milton Nelson, Jr.
Assistant Examiner—Anthony D. Barfield
Attorney, Agent, or Firm—Pitts & Brittian, P.C.

[57] ABSTRACT

An adjustable lumbar support device for installation within seats, and particularly vehicular seats, to enable a seat occupant to adjust a seat back to provide a desired amount of support for the lumbar region of the back. The adjustable lumbar seat support includes a pair of leaf spring members which are joined at their opposite edges with hinge members. Application of pressure to or release of pressure from the hinge members causes movement of the leaf members and a corresponding change in the central spacing between the leaf spring members such that the adjustable lumbar seat support is expanded or contracted. A flexion control device is provided to variably regulate the expansion and contraction of the hinge members such that the central spacing between the leaf spring members is changed and the adjustable lumbar seat support is expanded or contracted as desired. An actuator is also provided to enable the effortless operation of the flexion control device and use the adjustable lumbar seat support.

8 Claims, 7 Drawing Sheets

ADJUSTABLE LUMBAR SEAT SUPPORT

This application in part discloses and claims subject matter disclosed in my earlier filed pending application, Ser. No. 08/665,009, filed on Jun. 17, 1996.

TECHNICAL FIELD

The present invention relates generally to seats, including vehicular seats. More particularly, the present invention relates to an insert for such seats that provides adjustable lumbar support to a person utilizing the seat.

BACKGROUND ART

It is well recognized that a person sitting in a seat for extended time periods may desire to adjust to the seat to obtain greater seat comfort. An example is that of a person in a vehicle seat, such as a driver and/or a passenger. A primary area of desired comfort is the lower back or the lumbar region. This adjustment may be desirable because different persons utilize the seat and/or seat back as a means for overcoming discomfort during extended periods of sitting. As used herein, the term "seat" is to be interpreted as applying to a variety of seat structures including chair structures.

The discomfort problem has been addressed in the prior art in several ways. A simple, although not complete, solution is to utilize a pillow placed low in the seat against the back thereof. By configuring the pillow into different shapes, a variation in lumbar support can be achieved.

More permanent solutions to lumbar support problems have also been addressed, for example, in U.S. Pat. Nos. 5,076,643 issued to A. Colasanti, et al., on Dec. 31, 1993; and 5,190,348 issued to A. Colasanti on Mar. 2, 1993. Both of these devices require that a rigid mounting plate be positioned within the seat. In the '643 patent, a semi-flexible contoured plate is secured to the mounting plate and an inflatable bladder is positioned between the mounting plate and the contoured plate against which a user rests. The mounting plate is secured to the seat frame using a plurality of helically shaped springs. The bladder is fixed to the both the mounting plate and the contoured plate, using VELCRO®, to create an operational unit. A valve is also connected the bladder to permit air to enter or exit the bladder or, when closed, stabilizes the pressure within the bladder and, consequently, stabilizes the support given by the device. The pressure in the bladder is adjusted to give the desired support by varying the spacing between the contoured plate and the mounting plate. Use of the semi-contourable plate in the '643 device, especially in a well-used or worn seat, will render the passenger uncomfortable during longer travel as the plate edges will create discomfort. Repeated use of the seat back will result in a strain on the helical mounting springs which will cause the '643 device to mis-position and reduce its operative effectiveness. Moreover, repeated use of the bladder will cause fatigue to the perimeter of the bladder, failure of the bladder's walls and, ultimately, result operational failure of the device.

The '348 device includes a contoured plate which is mounted on the mounting plate and contained within an enclosure formed by the sealing of the inflatable bladder onto the mounting plate. As with the '643 device, the bladder of the '348 device is similarly connected to a valve which permits air to enter or exit the bladder or, when closed, stabilizes the pressure within the bladder and, thus, stabilizes the support given by the device. However, the '348 device fails to completely address the need for an adjustable lumbar support device. Through repeated use, the employment of a spring metal contour plate proximate the bladder surface will insure that the '348 device will eventually be rendered useless as the edges of the metal plate will wear through the bladder surface. Repeated use or defective securement can foreseeably cause failure of the connective seam between the bladder and the mounting plate. Moreover, such repeated use or defective securement can also foreseeably cause dissociation of the contour plate from the mounting plate.

Both of the devices described in the '643 and '348 patents are of complex construction and require substantial installation time. The requirements for the installation of a mounting plate, as well as the inter-securement of the bladder and plate elements, are primary reasons for the complexity of construction and the need of substantial time for installation of each device. Both of the devices are also structurally and functionally dissimilar from the present invention.

Other devices may appear to be integrable with either or both of the Colsanti devices and, in combination, appear similar to the device of the present invention. However, none of these devices, independently and/or in combination with either or both of the Colsanti devices, structurally or functionally resemble the present invention such that its conception would be obvious to one skilled in the art. Among these devices are those disclosed in U.S. Pat. Nos. 134,853 issued to E. Cliff on Jan. 14, 1873; 162,165 issued to G. F. Godley on Mar. 4, 1875; and, 4,567,615 issued to H. Fanti on Feb. 4, 1986.

The '853 patent to Cliff and the '165 patent to Godley disclose spring leaf devices for vehicles, which are distinguishable by their very purpose. Unlike the present invention, the Cliff device incorporates a plurality of layered, industrial strength spring leaves in its overall structure. The Cliff device also includes hinge members which must be secured to either bearing blocks or clip connections for effective operation. Moreover, the Cliff device fails to provide any means for the manual or automated regulation of its overall expansion or contraction.

The Godley device utilizes a pair of blocks disposed on opposite ends of a bolt. The blocks receive the ends of a series of retroverted springs or spring leaves and cooperate with the bolt to delimit the bounds of movement for the springs. The springs or spring leaves, independently or with the assistance of a helical spring positioned about the bolt, pre-dispose the blocks to an extreme position. In operation, the blocks oscillate along the bar depending on the degree of force exerted on them. Neither the Cliff device nor the Godley device is designed to be disposed in a seat or seat system. Neither the Cliff device nor the Godley device is designed to provide lumbar support for a seat occupant. Further, both the Cliff and the Godley device fail to provide any means for manual or automated regulation of its overall expansion or contraction.

The Fanti device discloses a spring-slat arrangement for a bed frame which includes mounting supports for mounting onto the longitudinal beams of a bed frame and a series of pairs of slats which are received in the mounting supports and which are disposed in a perpendicular relation to the beams. The Fanti device further includes an elastic strap which is centrally disposed on the slats and which runs along the straps in a parallel orientation to the beams. As with both Cliff and Godley, the Fanti device is not designed to be disposed in a seat or seat system. Nor is the Fanti device designed to provide lumbar support for a seat occupant. Similarly, Fanti fails to provide any means for manual or automated regulation of its overall expansion or contraction.

Consequently, it is neither obvious to one skilled in the art to combine any of these referenced to produce the subject matter of the present invention, nor does the combination of these references result in a device which approximates the structure and/or the function of the present invention.

Accordingly, it is an object of the present invention to provide an adjustable lumbar seat support for seats that can be installed with a minimum of labor.

It is also an object of the present invention to provide an adjustable lumbar seat support that does not require a separate mounting plate.

It is another object of the present invention to provide an adjustable lumbar seat support which is regulable using different regulation mechanisms.

Further, it is an object of the present invention to provide an adjustable lumbar seat support which is of durable construction, yet easy to manufacture.

These and other objects of the present invention will become apparent upon a consideration of the drawings referred to hereinafter, and a complete description thereof.

DISCLOSURE OF THE INVENTION

In accordance with the present invention there is provided an adjustable lumbar support for seats, such as vehicular seats. The adjustable lumbar seat support includes a pair of leaf spring members which are joined at their opposite edges with hinge mechanisms. The leaf spring members and the hinge mechanisms cooperate so as to provide a void between the leaf spring members by the junction of their opposite ends. The application of pressure to or the release of pressure from the hinge mechanisms cause movement of the leaf members. Movement of the leaf spring members changes the central spacing between the leaf spring members such that the adjustable lumbar seat support is expanded or contracted. The leaf spring members are fabricated from semi-flexible, slotted material. The length of each leaf spring member along each hinge mechanism, and the distance between the hinge mechanisms varies depending upon the size of the seat into which the support is to be placed. The leaf spring member slots are styled according to the purpose for which the lumbar seat support being fabricated. A flexion control device is provided to enable the variable regulation of the pressure applied to the hinge mechanisms and the corresponding change in the central spacing between the leaf spring members. The flexion control device is disposable between the leaf spring members. An actuator is also provided to facilitate operation of the flexion control device and to enable the operator to discretely select a desired discrete position for the adjustable lumbar seat support. In one embodiment, the actuator is manually operated. In another embodiment, operation of the actuator is automated.

BRIEF DESCRIPTION OF THE DRAWINGS

The above mentioned features of the invention will become more clearly understood from the following detailed description of the invention read together with the drawings in which.

BEST CODE FOR CARRYING OUT THE INVENTION

An adjustable lumbar seat support incorporating various features of the present invention is illustrated generally at 10 in the figures. The adjustable lumbar seat support 10 is designed to provide a lumbar support mechanism which is easily integrable into new or existing seat structures with minimal efforts and at minimal costs. Moreover, in the preferred embodiment, the adjustable lumbar seat support 10 is designed to enable discrete regulation of the degree of seat support provided to an individual's lumbar spine area, thereby maximizing the individual's comfort while using a seat.

Figure 1:
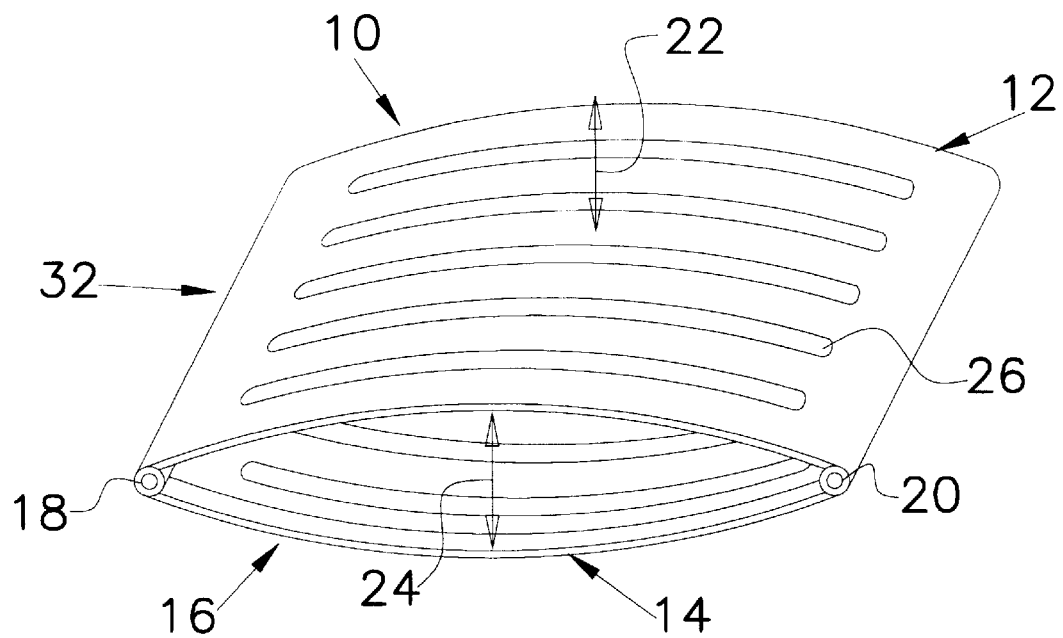
FIG. 1 is an isometric drawing of one embodiment of leaf spring members acting to the present invention.
Figure 3:
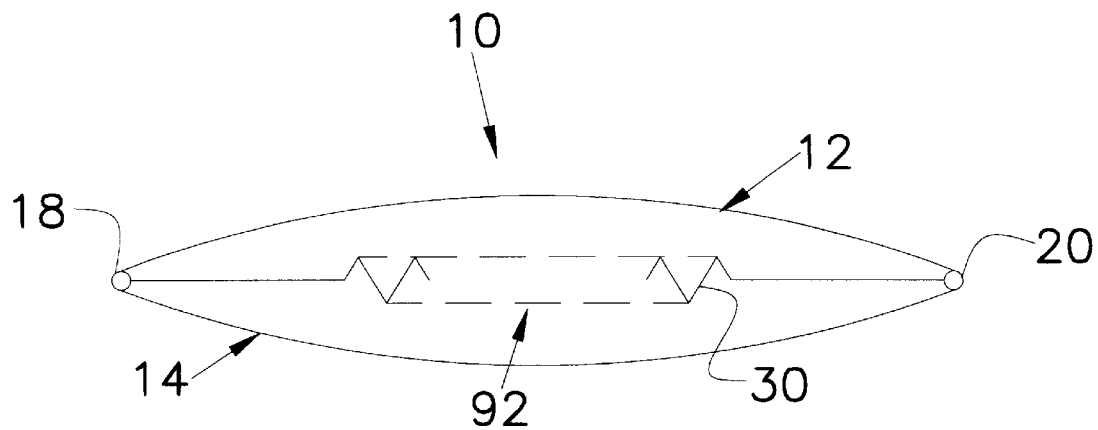
FIG. 3 is an embodiment that is a slight variation of FIG. 1.

FIG. 1 illustrates a configuration of leaf spring members 12, 14 used to achieve lumbar support for a seat. In this embodiment, the leaf spring members 12, 14 are arcuate in configuration so that when opposite edges are joined, a generally ellipsoidal void 16 is formed therebetween. The two leaf spring members 12, 14 are joined at their opposite edges with hinge mechanisms 18, 20 to form a leaf spring combination 32. In this manner, pivotal movement is permitted when pressure is applied or released against leaf spring member 12 as indicated by double-ended arrow 22. Such pressure application or release then changes the central spacing between the leaf spring members 12, 14 as indicated by the double-ended arrow 24. One method of providing such variable flexion is through the employment of a biasing member 30 as illustrated in FIG. 3.

Figure 2:
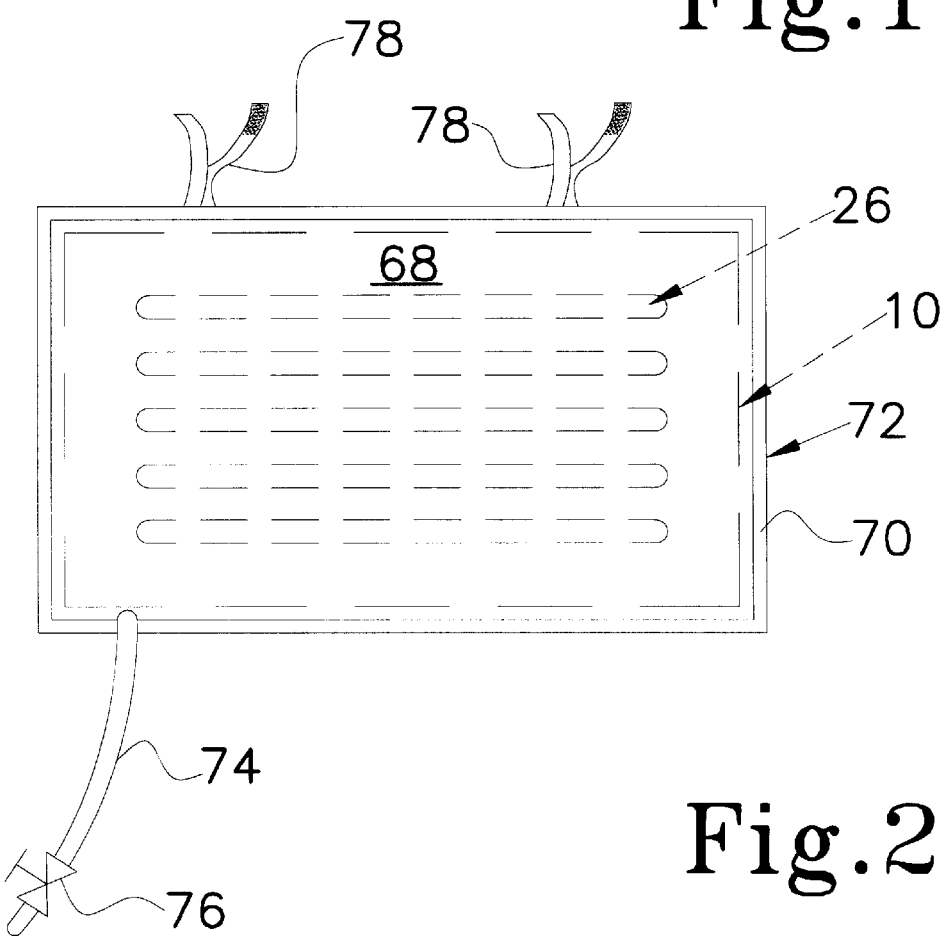
FIG. 2 is a drawing illustrating the encapsulation of the leaf spring members of FIG. 1 into a bladder.

Typically the leaf spring members 12, 14 are fabricated from semi-flexible material, such as a plastic. Typically, this can be ACETEL™. In the embodiment illustrated in FIG. 1, and phantom in FIG. 2, each of these leaf spring members 12, 14 are fabricated from slotted material, with the slots 26 running in a direction perpendicular to the hinge mechanisms 18, 20. The lengths of the spring members 12, 14 along the hinge mechanisms 18, 20, and the distance between the hinge mechanisms 18, 20, are chosen for a specific size of lumbar support, this depending upon the size of the seat into which the support is to be placed. The slots 26, similarly, are chosen for the specific style and purpose of the lumbar support being fabricated. Accordingly, it will be recognized that slot size and slot configuration can vary depending on the intended use of the adjustable lumbar seat support 10.

Figure 4:
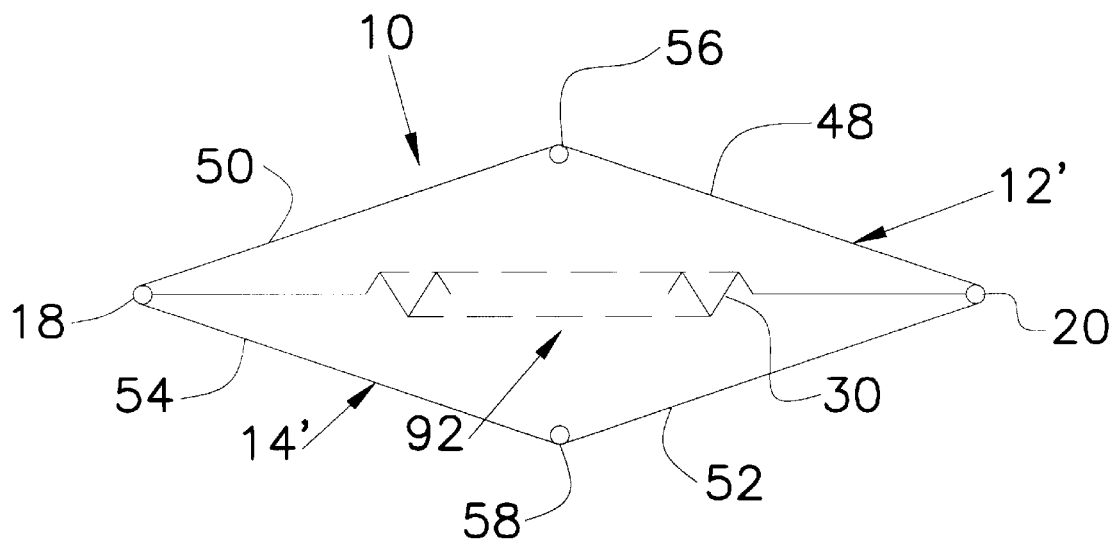
FIG. 4 is a drawing illustrating the divided leaf spring members and divided leaf spring hinge mechanisms of the present invention.
Figure 5:
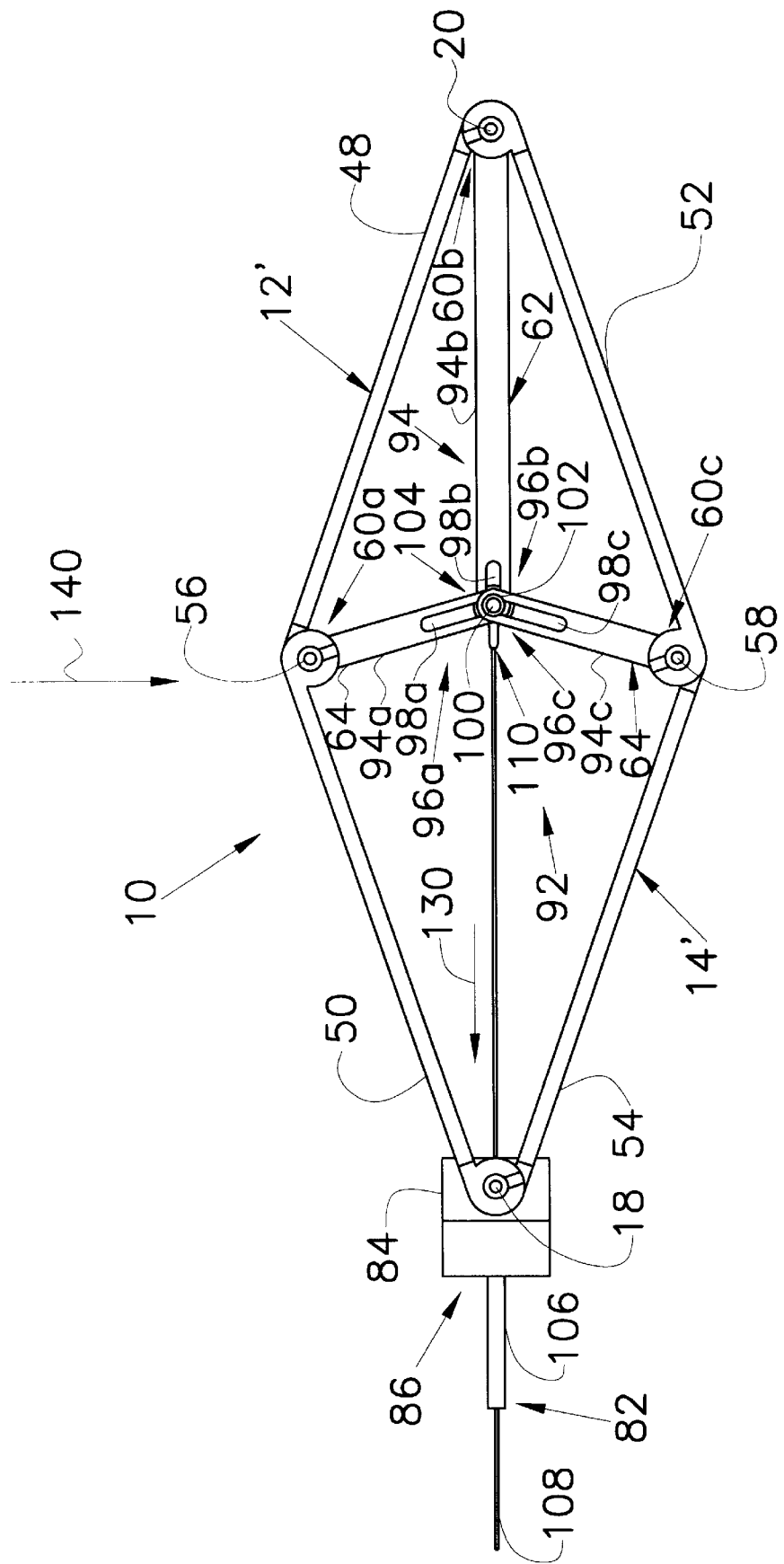
FIG. 5 is an end elevation view of the preferred embodiment of the present invention in an open or extended position.
Figure 6:
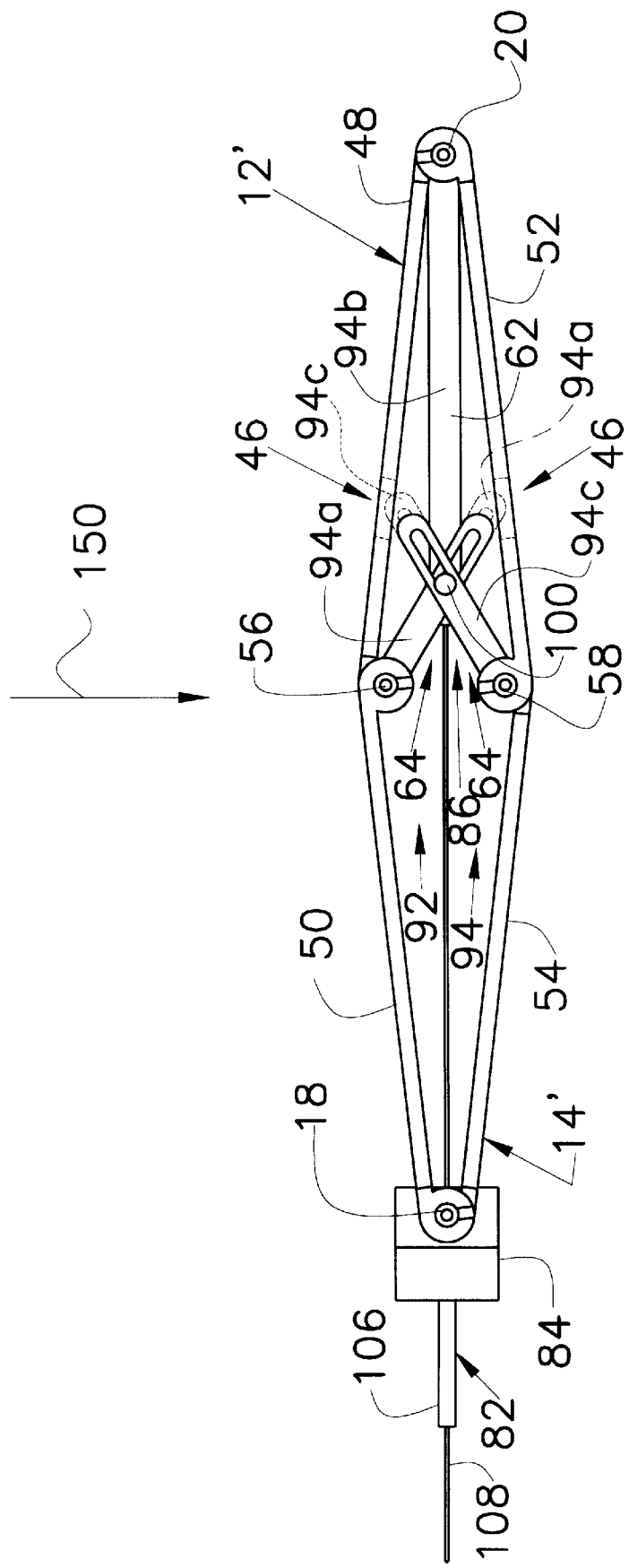
FIG. 6 illustrates an end elevation view of the preferred embodiment of the present invention depicted in FIG. 5, in an closed or contracted position.
Figure 7:
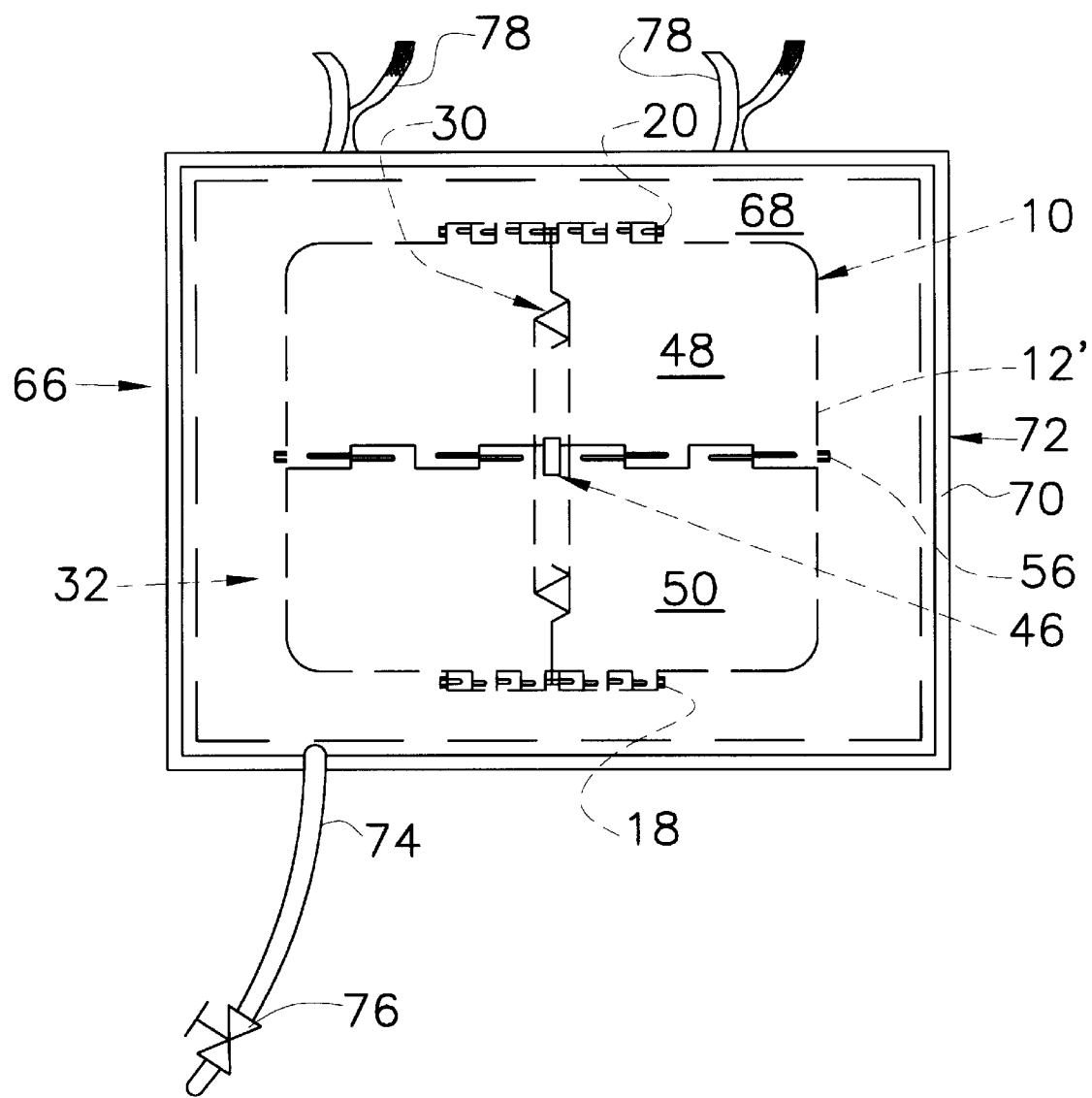
FIG. 7 is a side elevation view, in phantom, of the preferred embodiment the present invention including one type of actuator.

FIGS. 4–9 illustrate different configurations of the preferred embodiment of the present invention. In each of these configurations, rather than continuous leaf spring members 12, 14 as shown in FIG. 1, each of the leaf spring members 12', 14' is divided into two sections 48, 50, and 52, 54, as illustrated in FIGS. 4 and 5. Sections 48, 50 are joined by a divided leaf hinge mechanism 56, while sections 52, 54 are joined by a divided leaf hinge mechanism 58. In this preferred embodiment, each leaf spring member 12', 14' is fabricated from plastic. While it is foreseeable that the present invention may be fabricated such that the leaf spring members 12', 14' may be divisible into members of unequal proportion, or that the embodiments of FIGS. 3 and 4 can be combined to include a continuous leaf spring member 12 along one surface, and a divided leaf spring member 14' along the second surface, the leaf spring members 12', 14' of the preferred embodiment are divided into equally sized proportions. Moreover, as shown in FIG. 7, each leaf spring member 12', 14' of the preferred embodiment includes a centrally disposed slot 46.

A flexion control device 92 is disposed between the leaf spring members 12', 14' to variably regulate the degree of leaf flexion and, correspondingly, the degree of lumbar support provided by the adjustable lumbar seat support 10. As illustrated in FIGS. 3 and 4, in one embodiment, the flexion control device 92 is a biasing member 30, such as a spring, which joins hinge mechanisms 18, 20 and automatically biases leaf spring members 12', 14' in an open or extended position. As illustrated in FIGS. 5–9, in the preferred embodiment, the flexion control device 92 is disposed between hinge mechanisms 18, 20 and divided leaf hinge mechanisms 56, 58. Such a composite structure provides the adjustable lumbar support 10 with additional stiffness and, in turn, enables the discrete control of the support 10 so as to provide the occupant with a wider range of comfort settings.

As best illustrated in FIG. 5, the flexion control device 92 of the preferred embodiment includes a trinal extensor 94 having three trinal extensor members 94a, 94b, 94c wherein a first end 96a, 96b, 96c of each extensor member 94a, 94b, 94c defines an extensor slot 98a, 98b, 98c and each slot 98a, 98b, 98c is co-joined by a pivot 100. The pivot 100 functions to maintain the extensor slot 98a, 98b, 98c of each extensor member 94a, 94b, 94c in close proximity to each other and facilitate the opening and closure of the lumbar seat support 10. In the preferred embodiment, the pivot 100 is a rod having a threaded end 102 for receiving a nut 104 to secure the slotted ends 96a, 96b, 96c of the trinal extensor members 94a, 94b, 94c. Those skilled in the art will recognize that other suitable devices, including rivets, snap-rings and other similar devices, can be employed as a pivot 100 and function with effectiveness equivalent to the rod and nut assembly described herein.

As also illustrated in FIG. 5, trinal extensor member 94a includes a second end 60a opposite first end 96a. Trinal extensor member 94b also includes a second end 60b opposite first end 96b. Similarly, trinal extensor member 94c includes a second end 60c opposite first end 96c. Each second end 60a, 60b, 60c of each trinal extensor member 94a, 94b, 94c is received and positioned between leaf spring members 12', 14' such that the pivot 100 is centrally located between the leaf spring members 12', 14' when the leaf spring members 12', 14' are opened. In the preferred embodiment, the second end 60a of trinal extensor member 94a is centrally disposed on divided leaf hinge member 56, the second end 60c of trinal extensor member 94c is centrally disposed on divided leaf hinge member 58, and the second end 60b of trinal extensor member 94b is centrally disposed on hinge mechanism 20 of the leaf spring members 12', 14'.

In an open or extended position, as illustrated in FIG. 5, the pivot 100 engages each trinal extensor member 94a, 94b, 94c at one extreme of its respective extensor slot 98a, 98b, 98c. In a closed or retracted position, as illustrated in FIG. 6, the pivot 100 slidably moves to the opposite extreme of each trinal extensor slot 98a, 98b, 98c and a portion of the first end 96a, 96b, 96c of each trinal extensor member 94a, 94b, 94c enters, but does not protrude from the slots 46 disposed in each leaf spring member 12', 14'. This construction permits the maximal closure of the leaf spring members 12', 14' without risk of compromise of any elements surrounding the combination 32.

In the preferred embodiment illustrated in FIGS. 5 and 6, the trinal extensors 94a, 94b, 94c of the flexion device 92 are of differing lengths such that a longer extensor member 62 is disposed between two shorter extensor members 64, each of the shorter extensor members 64 being of equal length. Those skilled in the art will recognize that the fabrication of the leaf spring members 12', 14', as described herein, will permit the extension of the leaf spring members 12', 14' such that a square can be formed. However, such a conformation is not preferred as it would likely minimize the comfort experienced by an occupant sitting in a seat have such a lumbar support. The variation of trinal extensor member 94a, 94b, 94c length, as described in the preferred embodiment, constrains the leaf spring members 12', 14' to extend to a parallel shaped cross-section at its maximum and obviates the possibility of such discomfort.

The function of the flexion control device 92 is variably regulated by operation of an actuator 66 such that the desired discrete position of the adjustable lumbar seat support 10 is facilely found. In one embodiment, the actuator 66 is a bladder 68 which acts in conjunction with the leaf spring combination 32 that it closely encompasses. In this embodiment, shown in FIG. 7, the leaf spring combination 32 includes a biasing member 30. In this embodiment, the bladder 68 is typically fabricated from polyurethane. The bladder 68 further includes a seal 70 disposed about its perimeter 72 to insure the integrity of the overall adjustable lumbar seat support 10 structure. A tubing 74 communicates with the interior of the bladder 68 thereby permitting a change in air volume within the bladder 68. This tubing 74 includes a valve 76 to permit the change in this air volume. With the valve 76 open, and no pressure applied to the lumbar support, the leaf spring combination 32 is biased by the biasing member 30 to its maximum extended dimension and air fills the bladder 68. In turn, when the valve 76 is in an open position and pressure is applied against the leaf spring combination 32, air can be forced from the bladder 68 and the dimension of the leaf spring combination 32 can be varied until a desired lumbar support level is achieved. Closure of the valve 76 then stabilizes the volume of air within the bladder 68 whereby a constant volume of air is held in the bladder 68 and the desired lumbar support is maintained.

In this embodiment, the bladder 68 and the enclosed leaf combination 32 are positioned within a seat back near the junction of the seat back and the seat bottom (in the lumbar region). The back surface of the adjustable lumbar seat support 10 rests against conventional seat support frame members (Ford, for example, has a grid of rods) within the seat so as to bear against one of the leaf spring members 12', 14' to minimize any movement thereof. Where preferable, restraints 78 are provided to maintain the seat support 10 in place. Such restraints 78 may include straps, hook-and-loop fasteners or other fastening devices as are known in the art. While FIG. 7 illustrates an embodiment in which two restraints 78 are disposed on one side of its perimeter 72, those skilled in the art will recognize that such restraints 78 are also disposable about more than one side of the perimeter 72 of the bladder 68 as is preferable.

Figure 8:
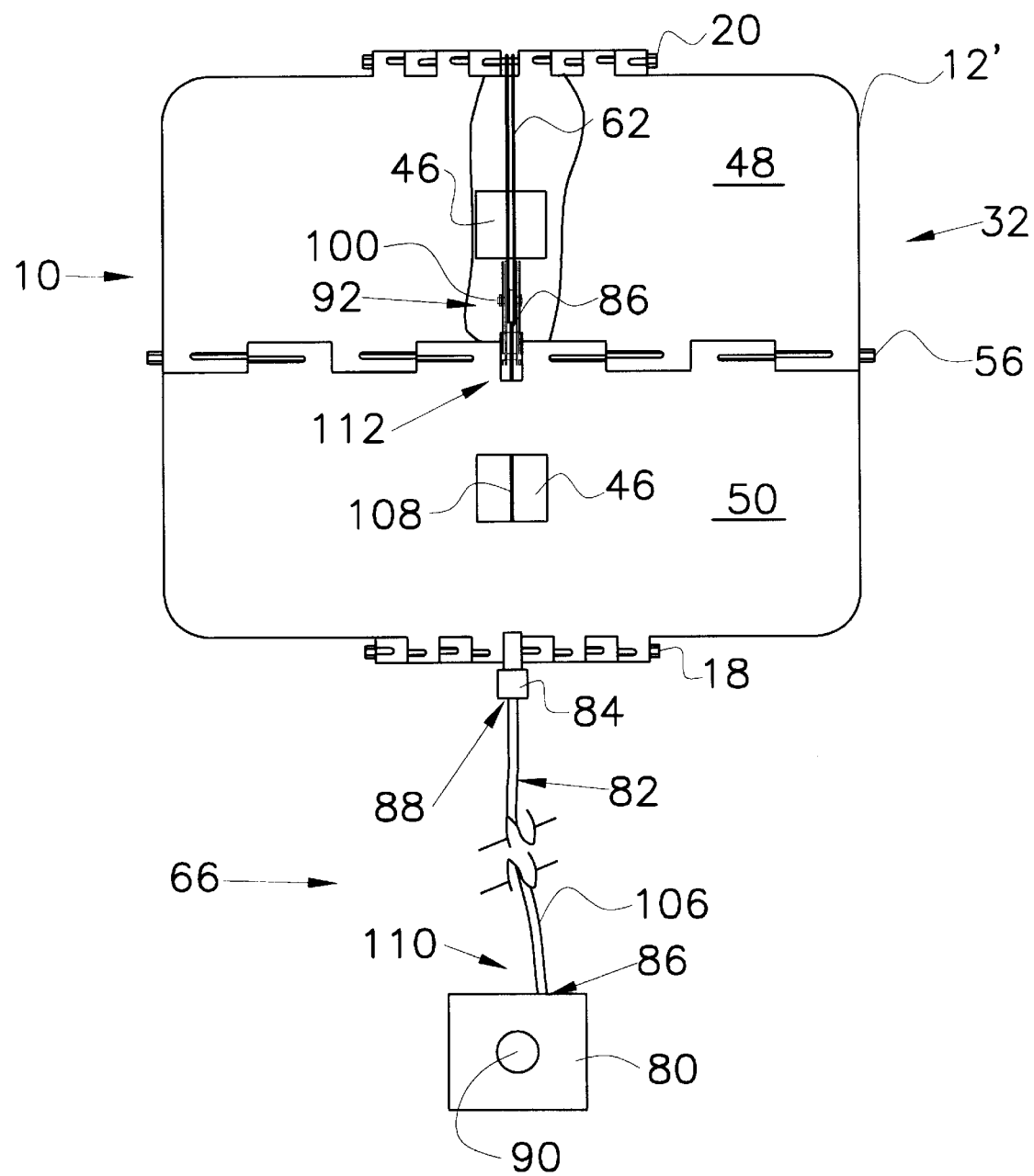
FIG. 8 is a side elevation view of the preferred embodiment of the present invention illustrated in FIG. 5, including another type of actuator.

In another embodiment illustrated in FIG. 8, the actuator 66 for the adjustable lumbar seat support 10 is a motor 80. The actuator 66 includes an actuator control 90 and an encased cable 82 disposed between the motor 80 and the adjustable lumbar support 10. The encased cable 82 includes a casing 106 and a cable wire 108 which slidably moves within the casing 106. The casing 106 includes a first end 86 and a second end 88. The cable wire 108 also includes a first end 110 and a second end 112. The first ends 86, 110 of the casing 106 and the cable wire 108 are secured to the motor 80. The second end 88 of the casing is secured to a cable guide 84. The cable wire 108 extends through the second end 88 of the casing 106, and the cable guide 84, and is attached to the pivot 100 at its second end 112. The cable guide 84 is secured to the hinge mechanism 18 to facilitate the movement of the cable wire 88 from within the leaf spring members 12', 14'.

Figure 9:
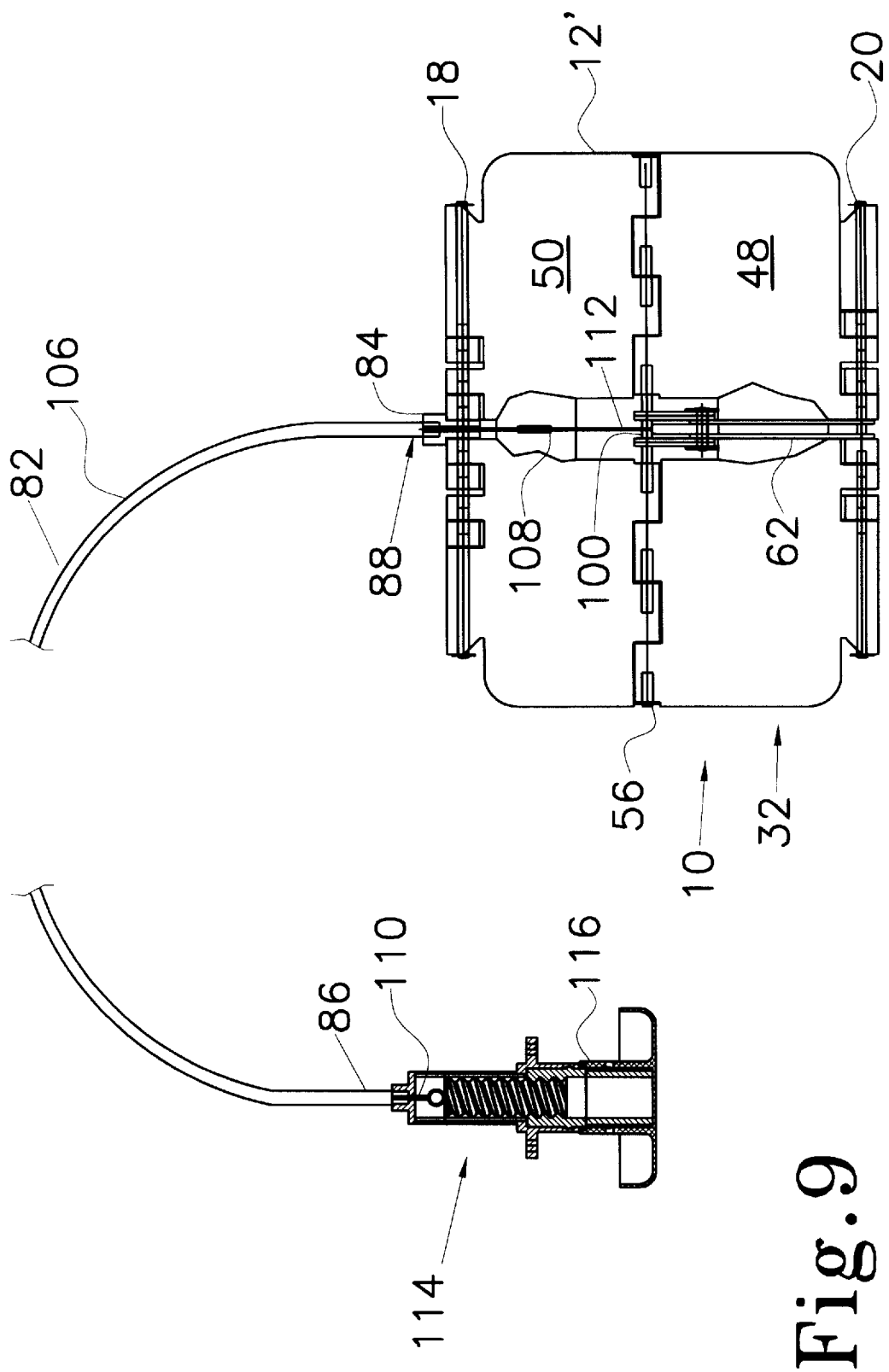
FIG. 9 is a side elevation view of the preferred embodiment of the present invention illustrated in FIG. 5, including yet another type of actuator.

Just as it is foreseeable that the actuator 66 of the adjustable lumbar support 10 is motorized, it is equally foreseeable that the actuator 66 of the adjustable lumbar seat support 10 is a manually operated control 114 such as is illustrated in FIG. 9. The manually controlled actuator 114 can be effectively incorporated into the adjustable lumbar seat support 10 such that a manual rotary device, such as a handle 116, is conveniently disposed along a seat and the lumbar support 10 is adjusted by manual rotation of the handle 116 in a clockwise or counter-clockwise direction.

As discussed herein, the cable wire 108 can be tensioned from an electrically, mechanically or otherwise operated device. In operation, when the cable wire 108 is tensioned, the tension causes hinge member 20 to be drawn to hinge member 18. The tension force on the cable wire 108 is illustrated by arrow 130 in FIG. 5. As hinge member 20 is drawn to hinge member 18, divided leaf hinge members 56, 58 are simultaneously opened or extended outwardly with a force sufficient to overcome the force being exerted against the leaf spring combination 32 and provide adjustable lumbar support to the seat occupant. In FIG. 5, arrow 140 represents the force being exerted against the spring leaf combination 32. When the cable tension is released, the pressure exerted against the leaf spring combination 32 functions to cause the leaf spring members 12', 14' of the combination 32 to retract or close. The pressure exerted against the leaf spring combination 32, after the cable tension has been eased, is shown by arrow 150 in FIG. 6. Movement between the positions illustrated in FIGS. 5 and 6 is facilitated by provision of the slots 98a, 98b, 98c which enable variation of the pivot point of the trinal extensors 94a, 94b, 94c.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. An adjustable lumbar support for seats, said lumbar support comprising:

at least two opposed leaf spring members, said leaf spring members being configured to provide a variable void therebetween;

at least one pair of hinge mechanisms, one hinge mechanism each for joining a pair of opposite edges of said leaf spring members, each of said leaf spring members being divided, adjoining edges of said divided leaf spring members being joined by divided leaf hinge mechanisms whereby an angularly shaped void being formed therebetween when said leaf spring members are joined at said hinge mechanisms such that the distance separating said leaf spring members increases as said hinge mechanisms are drawn together, said divided leaf spring members each defining a slot; and a flexion control device for selectively regulating the degree of separation between said leaf spring members to obtain a selected support by said lumbar support, said flexion control device being disposed within said void joining said hinge mechanisms such that said slots encompass a portion of said flexion control device and the distance separating said leaf spring members diminishes further as said leaf spring members are drawn together, said flexion control device being a composite structure which enables the discrete control of the degree of flexion of the adjustable lumbar support thereby providing the occupant with a wider range of lumbar support comfort, said composite structure including a trinal extensor having three extensor members, each of said extensor members having a first end and a second end, each first end of each extensor member defining an extensor slot, each extensor slot being co-joined by a pivot for maintaining each of said extensor slots in close relative proximity, said second extensor member ends being positioned one each on each of said divided leaf hinge mechanisms as well as on one of said hinge mechanisms such that said pivot is centrally located between said leaf spring members when said lumbar support is in an opened position, said pivot enabling the slidable movement of said first extensor member ends such that said leaf spring members are variably disposable between an open and a closed position, a portion of said first extensor member ends being received in each said leaf spring member slot when said lumbar support is in a closed position.

2. The adjustable lumbar support of claim 1 wherein said pivot for receiving said slotted ends of said trinal extensor members is selected from the group of connective devices including a nut and bolt assembly, a rivet, a snap ring, and other similar connective devices, said bolt having at least one threaded end, said threaded end for receiving said nut, said nut for keeping said trinal extensor member slotted ends on said rod.

3. The adjustable lumbar support of claim 2 wherein said trinal extensor members of said flexion control device differ in length to facilitate the variable dimensioning of said leaf spring members, a longer trinal extensor member being disposed between two shorter trinal extensor members, said shorter trinal extensor members being of equal length such that said leaf spring members define said parallel leaf cross-section, said second end of said longer trinal extensor member being received on one of said hinge mechanisms, said second ends of said shorter trinal extensor members being received on one each of said divided leaf hinge mechanisms.

4. The adjustable lumbar support of claim 3 further comprising an actuating mechanism for cooperating said flexion control device such that the desirable discrete position for said lumbar support is facilely found.

5. The adjustable lumbar support of claim 4 wherein said actuating mechanism is a motor having an actuator control and an encased cable disposed between said motor and said lumbar support for the motorized operation of said lumbar support, said actuator control being a switch to activate and control the operation of said motor, said encased cable including a casing and a cable wire which slidably moves within said casing, said casing and said cable wire each having a first end and a second end, said first end of each of said casing and said cable being connected to said motor, said second end of said casing being secured a cable guide, said cable guide being received on said hinge mechanism opposite said longer trinal extensor, said cable wire being secured on said pivot of said flexion control device at said second cable wire end such that manipulation of said switch activates said motor and enables the motorized adjustment of said flexion control device and said adjustable lumbar support.

6. The adjustable lumbar support of claim 4 wherein said actuating mechanism is a manual actuation control and an encased cable disposed between said manual actuation control and said lumbar support for the manual operation of said lumbar support, said manual actuation control being a handle, said encased cable including a casing and a cable wire which slidably moves within said casing, said casing and said cable wire each having a first end and a second end, said first end of each of said casing and said cable being connected to said handle, said second end of said casing being secured a cable guide, said cable guide being received on said hinge mechanism opposite said longer trinal extensor, said cable wire being secured at said second cable wire end to said pivot of said flexion control device such that manipulation of said handle enables the manual adjustment of said adjustable lumbar support.

7. An adjustable lumbar support for seats, said lumbar support comprising:

at least two opposed leaf spring members, said leaf spring members being configured to provide a variable void therebetween;

at least one pair of hinge mechanisms, one hinge mechanism each for joining a pair of opposite edges of said leaf spring members, each of said leaf spring members being divided, adjoining edges of said divided leaf spring members being joined by divided leaf hinge mechanisms whereby an angularly shaped void is formed therebetween when said leaf spring members are joined at said hinge mechanisms such that the distance separating said leaf spring members increases as said hinge members are drawn together, said divided leaf spring members each defining a slot;

a flexion control device for variably adjusting said leaf spring members to obtain a selected support by said lumbar support, said flexion control device being positioned within said void such that said slots encompass said flexion control device as said leaf spring members are drawn together, said flexion control device including a trinal extensor having three extensor members of differing length to facilitate the variable dimensioning of said leaf spring members, a longer trinal extensor member being disposed between two shorter trinal extensor members, said shorter trinal extensor members being of equal length such that said leaf spring members define a parallel cross-section, each of said trinal extensor members having a first end and a second end, each first end of each extensor member defining an extensor slot, each extensor slot being co-joined by a rod for maintaining each of said extensor slots in close relative proximity, said second extensor member ends being positioned one each on each of said divided leaf hinge mechanisms as well as on one of said hinge mechanisms such that said rod is centrally located between said leaf members, said rod having at least one threaded end for receiving a nut to keep said slotted ends on said rod, said rod for enabling the slidable movement of said first extensor member ends such that said leaf members are variably disposable between an open and a closed position, said first extensor member ends being received in each said leaf spring member slot when said support is in a closed position; and an actuating mechanism for operating said flexion control device, said actuating mechanism being motorized for enabling the automated operation of said adjustable lumbar support, said actuating mechanism including a motor having an actuator control and an encased cable disposed between said motor and said lumbar support, said actuator control being a switch to activate and control the operation of said motor, said encased cable including a casing and a cable wire which slidably moves within said casing, said casing and said cable wire each having a first end and a second end, said first end of each of said casing and said cable being connected to said motor, said second end of said casing being secured a cable guide, said cable guide being received on said hinge mechanism opposite said longer trinal extensor, said cable wire being secured on said pivot of said flexion control device at said second cable wire end such that manipulation of said switch activates said motor and enables the motorized adjustment of said flexion control device and said adjustable lumbar support.

8. An adjustable lumbar support for seats, said lumbar support comprising:

at least two opposed leaf spring members, said leaf spring members being configured to provide a variable void therebetween;

at least one pair of hinge mechanisms, one hinge mechanism each for joining a pair of opposite edges of said leaf spring members, each of said leaf spring members being divided, adjoining edges of said divided leaf spring members being joined by divided leaf hinge mechanisms whereby an angularly shaped void is formed therebetween when said leaf spring members are joined at said hinge mechanisms such that the distance separating said leaf spring members increases as said hinge mechanisms are drawn together;

a flexion control device for variably adjusting said leaf spring members to obtain a selected support by said lumbar support, said flexion control device being positioned within said void such that said slots encompass said flexion control device as said leaf spring members are drawn together, said flexion control device including a trinal extensor having three extensor members of differing length to facilitate the variable dimensioning of said leaf spring members, a longer trinal extensor member being disposed between two shorter trinal extensor members, said shorter trinal extensor members being of equal length such that said leaf spring members define a parallel cross-section, each of said trinal extensor members having a first end and a second end, each first end of each extensor member defining an extensor slot, each extensor slot being co-joined by a rod for maintaining each of said extensor slots in close relative proximity, said second extensor member ends being positioned one each on each of said divided leaf hinge mechanisms as well as on one of said hinge mechanisms such that said rod is centrally located between said leaf members, said rod having at least one threaded end for receiving a nut to keep said slotted ends on said rod, said rod for enabling the slidable movement of said first extensor member ends such that said leaf members are variably disposable between an open and a closed position, said first extensor member ends being received in said leaf spring member slots when said support is in the closed position; and an actuating mechanism for manually operating said flexion control device of said adjustable lumbar support, said actuating mechanism including a manual actuation control and an encased cable disposed between said manual actuation control and said lumbar support, said manual actuation control being a handle, said encased cable including a casing and a cable wire which slidably moves within said casing, said casing and said cable wire each having a first end and a second end, said first end of each of said casing and said cable being connected to said handle, said second end of said casing being secured a cable guide, said cable guide being received on said hinge mechanism opposite said longer trinal extensor, said cable wire being secured at said second cable wire end to said pivot of said flexion control device such that manipulation of said handle enables the manual adjustment of said adjustable lumbar support.

\* \* \* \* \*